United States Patent
Wang et al.

(10) Patent No.: US 7,224,865 B1
(45) Date of Patent: May 29, 2007

(54) OPTICAL MULTIPLEXING/MULTIPLEXING DEVICES AND METHOD FOR MAKING THE SAME

(75) Inventors: Daoyi Wang, Sunnyvale, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 11/379,788

(22) Filed: Apr. 23, 2006

(51) Int. Cl.
  *G02B 6/32* (2006.01)
  *G02B 6/26* (2006.01)
  *G02B 6/42* (2006.01)

(52) U.S. Cl. ............... 385/34; 385/15; 385/31; 385/33; 385/38; 385/39; 385/50

(58) Field of Classification Search ............ 385/34
See application file for complete search history.

(56) References Cited

U.S. PATENT DOCUMENTS

| | | | |
|---|---|---|---|
| 4,244,045 A | 1/1981 | Nosu | |
| 5,786,915 A | 7/1998 | Scobey | |
| 5,801,892 A * | 9/1998 | Naganuma et al. | 359/892 |
| 5,905,827 A * | 5/1999 | Naganuma et al. | 385/31 |
| 6,185,347 B1 * | 2/2001 | Zheng | 385/34 |
| 6,272,264 B1 * | 8/2001 | Li et al. | 385/27 |
| 6,400,867 B1 * | 6/2002 | Liu | 385/33 |
| 6,515,776 B1 * | 2/2003 | Naganuma | 398/82 |
| 6,711,325 B2 * | 3/2004 | Hwang et al. | 385/24 |

\* cited by examiner

*Primary Examiner*—Frank G. Font
*Assistant Examiner*—Ryan Lepisto
(74) *Attorney, Agent, or Firm*—Joe Zheng

(57) ABSTRACT

Techniques for designing optical devices that can be manufactured in volume are disclosed. An optical assembly is build individually and includes a first tube with one end being polished to a slanted angle and attached with a filter. Because of the slanted angle, a predefined angle of incidence can be defined. The assembly is then bonded to a substrate on which other components or more such assemblies are bonded to form an integrated piece. Depending on implementation, the first tube may include no other element, a lens, or a lens and a fiber pigtail that are encapsulated. In the case that the first tube includes no other element or only a lens, a second tube is provided to include a fiber pigtail and a lens, or simply a fiber pigtail. One of the advantages of having two tubes is the underlying mechanism providing a lateral adjustment between the two tubes.

17 Claims, 6 Drawing Sheets

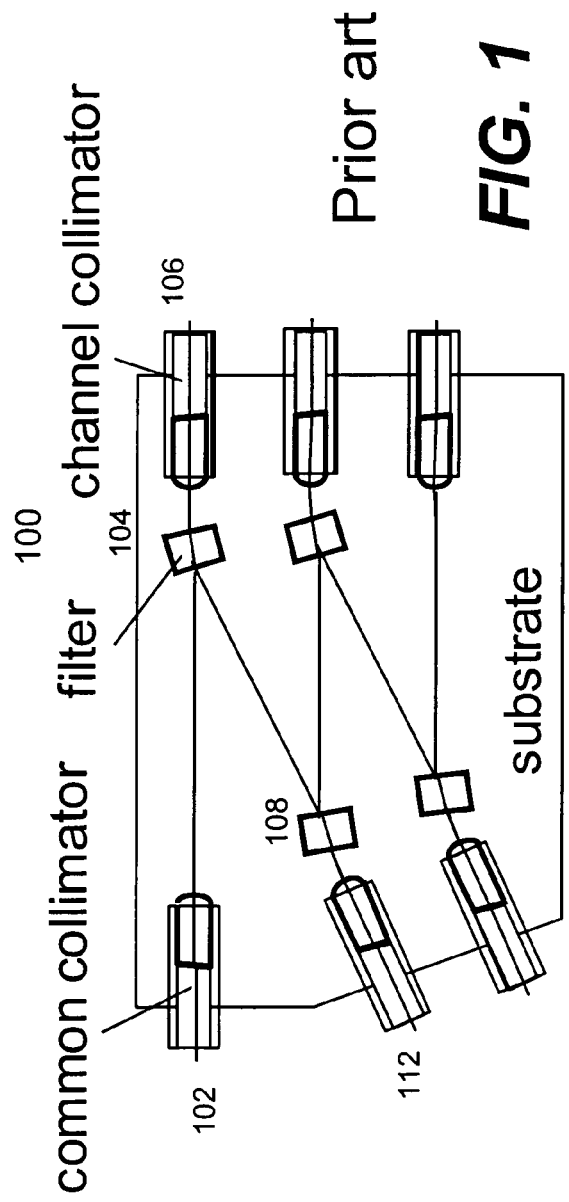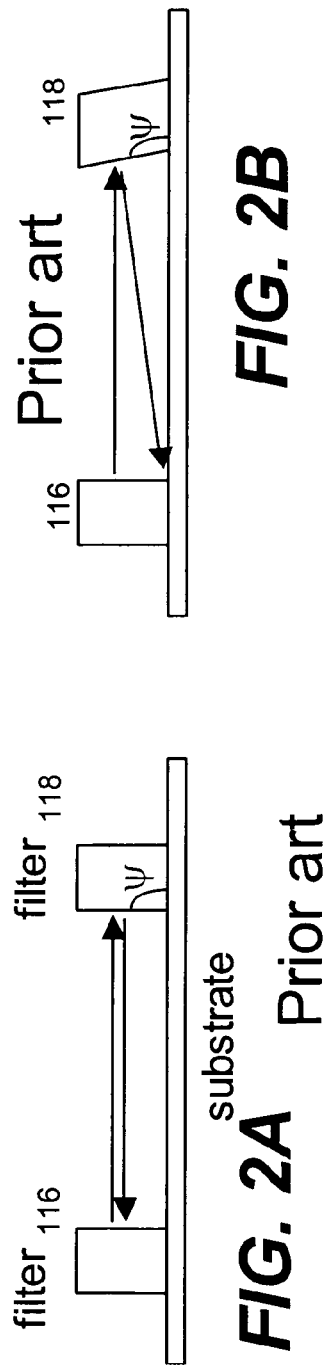

OPTICAL MULTIPLEXING/MULTIPLEXING DEVICES AND METHOD FOR MAKING THE SAME

BACKGROUND OF THE INVENTION

1. Field of the Invention

The invention is generally related to the area of optical devices. In particular, the present invention is related to optical wavelength multiplexing/demultiplexer or add/drop devices with new optical layouts and manufacturing processes.

2. The Background of Related Art

Optical add/drop and multiplexer/demultiplexer devices are optical components often used in optical systems and networks. FIG. 1 shows a typical multiplexer/demultiplexer device 100 utilizing what is referred to as a free-space cascading structure. The input signals including wavelengths $\lambda_1, \lambda_2, \ldots \lambda_K, \ldots \lambda_N$ is coupled into a common collimator 102 of the device 100. The beam of the input signals is collimated and then propagates in free space before impinging upon a first filter 104. For example, the first filter transmits a wavelength $\lambda_1$ and reflects all others. As a result, a signal at wavelength $\lambda_1$ passes the filter 104 and coupled out via a collimator 106.

The reflected signals going through a second filter 108 that transmits a signal at wavelength $\lambda_2$ and reflects all others. The signal at wavelength $\lambda_2$ passing through the second filter 108 is coupled out by a collimator 112. The reflected signals from the second filter 108 are successively transmitted and reflected through the remaining filters and collimators. Subsequently, the signals at wavelengths $\lambda_1, \lambda_2, \ldots \lambda_K, \ldots \lambda_N$ are all separated through the multiplexer/demultiplexer device 100.

It is, however, noted that the collimators and filters are bonded to a common substrate separately. Thus a filter and a collimator for the same channel (e.g., a particular wavelength) are isolated. The beam angle of incidence (AOI), which influences which wavelength can pass, is adjusted by rotating the filter. For 100 GHz DWDM, the central wavelength control accuracy is required to be within 0.03 nm, which means 0.1° of rotation with fixation accuracy assuming AOI=1.8°. Such accuracy is indeed a challenge for manufacturing such devices in volume. The prior art may work fine for CWDM as the margins of a central wavelength and the bandwidth thereof are relatively more tolerable, but it is difficult to extend such manufacturing process to DWDM devices.

Another significant disadvantage of the prior art devices is that they require coating surface perfectly perpendicular to the substrate. FIG. 2A shows a side view of two filters of FIG. 1, where both filters 116 and 118, or their coating surfaces are perpendicular to the substrate 120, requiring an incoming light beam is reflected back at the same height. If the sidewall of the filter 118 is not perpendicular to the substrate 120 as shown in FIG. 2B, namely its angle $\Psi$ is not 90°, then the reflected beam would point either up or down. Consequently, after multiple bounces between the filters as shown in FIG. 1, the beam may hit the edge of a filter, leading to performance degradation, or hit the substrate, leading to beam clipping loss.

Accordingly, there is a great need for multiplexing/demultiplexer or add/drop devices that can be efficiently manufactured in volume.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, an assembly is build individually. The assembly includes a first tube with two ends, one of the two ends being polished to a slanted angle and attached with an optical filter in accordance with a predefined angle of incidence such that the optical filter transmits a signal of a predefined wavelength. The assembly is then bonded to a substrate on which other components or such assemblies are bonded to form an integrated piece.

Depending on implementation, the first tube may include no other element, a lens, or a lens and a fiber pigtail that are encapsulated, both the lens and the fiber pigtail being coaxially aligned. In the case that the first tube includes no other element or only a lens, a second tube is provided to include a fiber pigtail and a lens, or simply a fiber pigtail. One of the advantages of having two tubes is the underlying mechanism providing a lateral adjustment between the two tubes.

The present invention may be implemented in many ways as a subsystem, a device or a method. According to one embodiment, the present invention is an optical apparatus. According to another embodiment, the present invention is a method for making such optical apparatus, the method comprises: building an assembly that includes a first tube with two ends, one of the two ends being polished to a slanted angle in accordance with a predefined angle of incidence; attaching an optical filter to the slanted end such that the optical filter transmits a signal of a predefined wavelength; and bonding the assembly and common collimator onto a substrate to form an integrated piece.

One of the objects, features, advantages of the present invention is the easy adjustment of a beam angle of incidence. Another one of the advantages, features, or benefits in the present invention is that the requirement of a coating surface having to be perfectly perpendicular to the substrate is relaxed.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 1 shows a typical multiplexer/demultiplexer device utilizing what is referred to as a free-space cascading structure;

FIG. 2A shows a side view of two filters of FIG. 1;

FIG. 2B shows the sidewall of one of the two filters being not perpendicular to the substrate;

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 3:
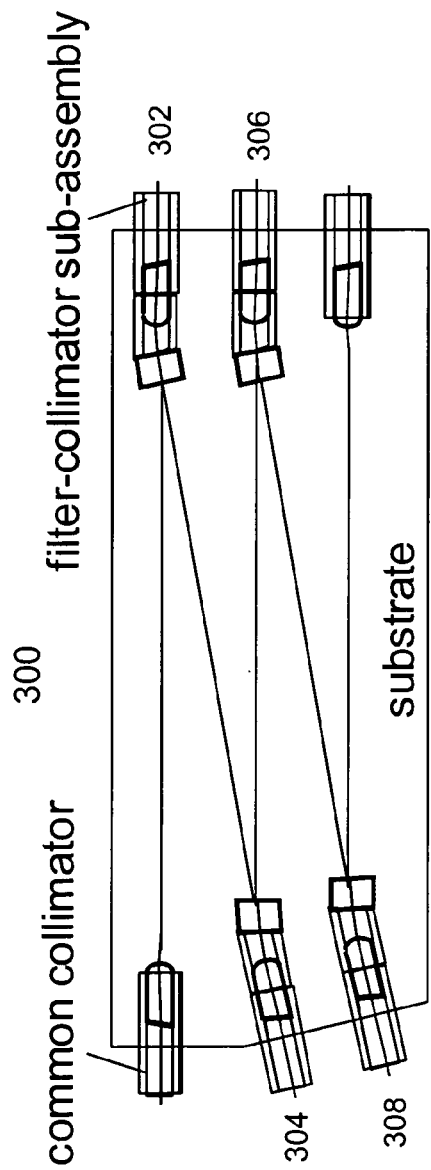
FIG. 3 shows one exemplary device according to one embodiment of the present invention.

Referring now to the drawings, in which like numerals refer to like parts throughout the several views. FIG. 3 shows one device 300 according to one embodiment of the present invention. One of the features in the device 300 is that there are individual assemblies, each integrating a filter and a collimator. As shown in FIG. 3, the device 300 includes four such assemblies 302, 304, 306 and 308. For each channel, a filter and a collimator are bonded together, forming an assembly. More may be added depending on applications or the number of wavelengths or channels to be multiplexed or demultiplexed.

In operation, a multiplexed signal or light beam is coupled into the device 300 via a common collimator 310. A collimated beam from the collimator 310 bounces in a zigzag fashion between the assemblies 302, 304, 306 and 308 to demultiplexe the multiplexed signal into individual channel signal.

Figure 4:
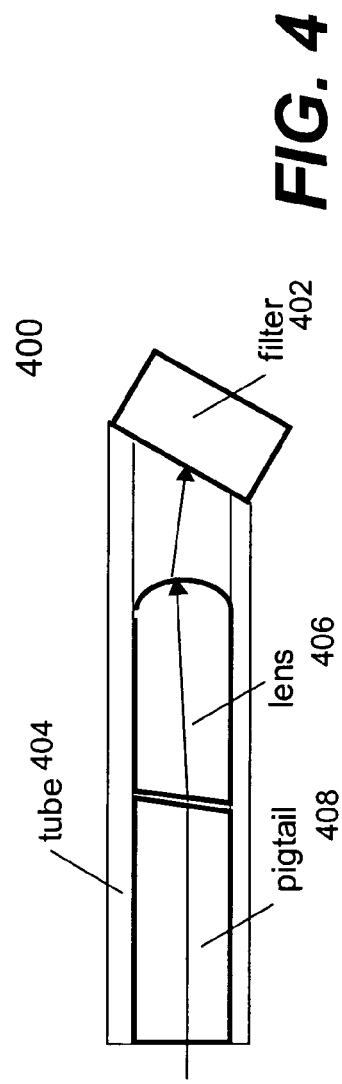
FIG. 4 shows an exemplary configuration of a filter-collimator assembly that may be used in FIG. 3.

FIG. 4 shows an exemplary configuration of a filter-collimator assembly 400 that may be used in FIG. 3. A filter 402 is attached to a tube 404 that encapsulates a collimator 406 and a fiber pigtail 408. In one embodiment, a glass cylindrical tube encapsulates a fiber and a collimation lens, both coaxially aligned. A fiber pigtail is also inserted to face the collimation lens. A gap between the pigtail and the lens is adjusted so as to collimate properly a light beam from the fiber pigtail. The collimated beam then propagates to a filter attached to or bonded with the tube. Generally, the contact surface of the tube with the filter is well polished and at the right angle for a preferred beam AOI to the thin film filter.

FIG. 4 demonstrates one type of filter-collimator assembly, in which one link tube is used. The AOI is fixed and determined by the polished angle at the tube contact face. One of the advantages of this type is its inherent stability. It may be mostly suitable for applications without accurate wavelength requirement, such as CWDM.

Figure 5:
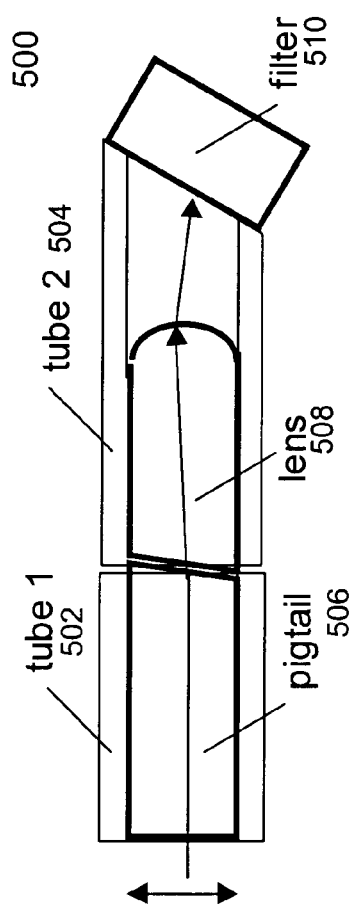
FIG. 5 shows another exemplary configuration of a filter-collimator assembly that may be used in FIG. 3.

FIG. 5 shows another exemplary configuration of a filter-collimator assembly 500 that may be used in FIG. 3. The assembly 500 features two link tubes 502 and 504. The tube 502 holds a pigtail 506 while the tube 504 holds a lens 508 and a filter 510. By laterally adjusting the offset between the tube 502 and the tube 504, the beam exiting from the collimation lens can be tilted to a preferred angle. The contact surface of the tube 504 with the filter 510 is polished to a preferred angle. This polish angle, together with the laterally adjusting achieved via the tube 502, determines the AOI to the filter. In one respect, a direct angle rotation in the prior arts can be done by an indirect offset adjustment. The angle tuning relation is: $\Delta\theta = \Delta x/F$, where $\Delta\theta$, $\Delta x$, and $F$ represents an angle change, a lateral offset, and a lens focal length. For example, F=2.5 mm, then a 4 um lateral offset results in 0.1° AOI change, corresponding to 0.03 nm wavelength control accuracy. Practically, the lateral adjustment of 4 um is easier than direct rotation of 0.10. In operation, after all the adjustments are done, the tubes 502 and 504 are bonded together, for example, using a type of epoxy.

Figure 6B:
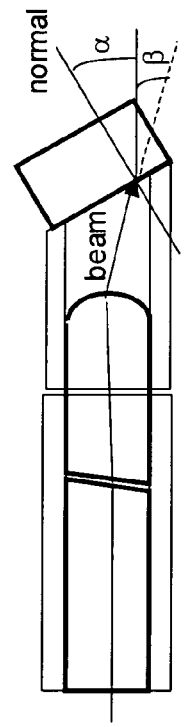
FIG. 6A and FIG. 6B show respectively two assemblies that each use two link tubes.
Figure 6A:
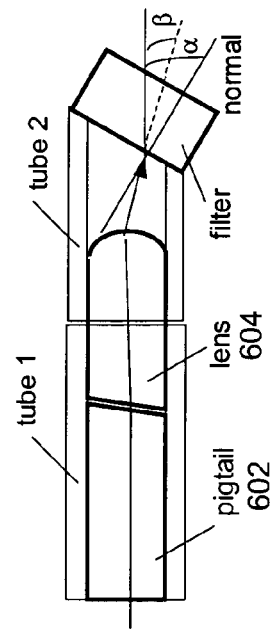

Referring now to FIG. 6A and FIG. 6B, there show respectively two assemblies that each use two link tubes. As shown in FIG. 6A, a gap between a pigtail 602 and a lens 604 is fully encapsulated in tube 1. The pigtail 602, the lens 604, and tube 1 form a collimator except that the lens head is exposed or exceeds the length of the tube 1. The tube 2 and the filter are integrated and can receive the exposed portion of the lens 604. One of the advantages of this assembly is that the two tubes may rotate against each other. With rotating tube 2 around the mechanical axis of tube 1, the normal of the filter also rotates but in a 3-dimension space before they are bonded together via the lens 604. FIG. 6A and FIG. 6B show two special positions. For the position illustrated in FIG. 6A, the filter normal is at the lowest, while for FIG. 6B, the normal is at the highest. Consequently, the beam AOI: $\theta = \alpha - \beta$ and $\theta = \alpha + \beta$, where $\alpha$ is the angle between the tube axis and the filter normal, and $\beta$ is the angle between the tube axis and the beam exiting the lens.

Operationally, the angle tuning range is $2\beta$, where the angle $\beta$ is a characteristic angle for a regular collimator, often referred to as a pointing angle. It is determined by the pigtail and the lens polish angle at their joint as well as the pigtail fiber position, etc. Usually a pointing angle is around 0.5°, resulting in 1° AOI adjustment range, corresponding to about 1 nm wavelength range. It should be noted that 1° AOI change is obtained through rotating tube 2 by 360°. On average, the angular adjustment amplification factor is 360, which essentially makes the wavelength adjustment 360 times easier.

Figure 7:
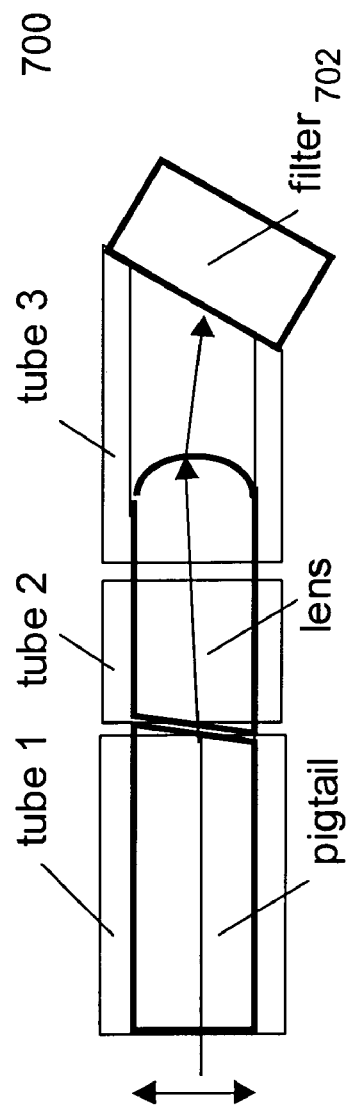
FIG. 7 shows an assembly with three link tubes.

Referring now to FIG. 7, there shows an assembly 700 with three link tubes. Each of the tubes may be rotated individually. The beam AOI on the filter 702 can be adjusted either by a lateral offset between tube 1 and tube 2, or rotation of tube 3 around tube 2.

Figure 8A:
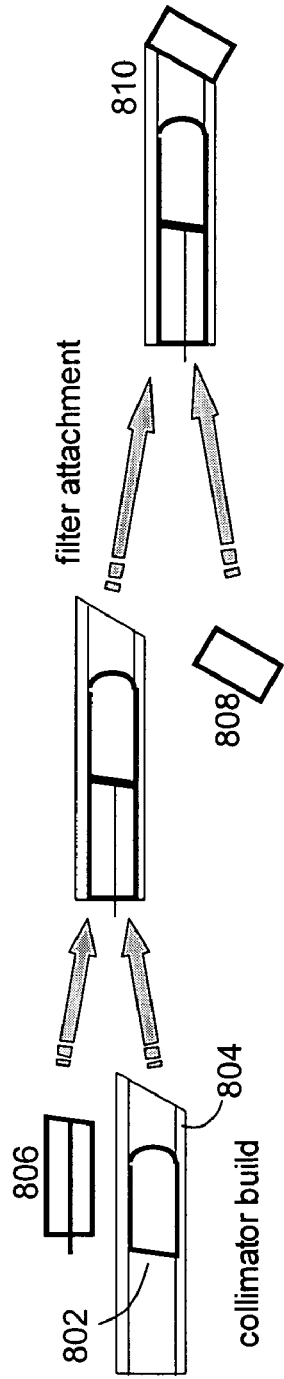
FIG. 8A shows a processes for the assembly of FIG. 4, which may be considered as two independent phases.

FIG. 4, FIG. 5, FIG. 6 and FIG. 7 shows respectively some exemplary assemblies. Different assemblies may vary from their building processes. FIG. 8A shows the processes for the assembly of FIG. 4, which may be considered as two independent phases: regular collimator building and filter attachment. For the collimator building, first fixing a lens 802 in a link tube 804 with a certain amount of selected epoxy or other bonding means, then putting a pigtail 806 into the tube 804 from the flat side of the tube 804, adjusting the position of pigtail 806, especially the air gap between the pigtail 806 and the lens 802 to minimize the coupling loss from a reference collimator placed at the specified distance to the collimator under building, finally bonding the pigtail 806 with the tube 804 using the epoxy or other bonding means. Once the collimator building is done, bonding a filter 808 to the tube end at the lens side to form an assembly 810.

Figure 8B:
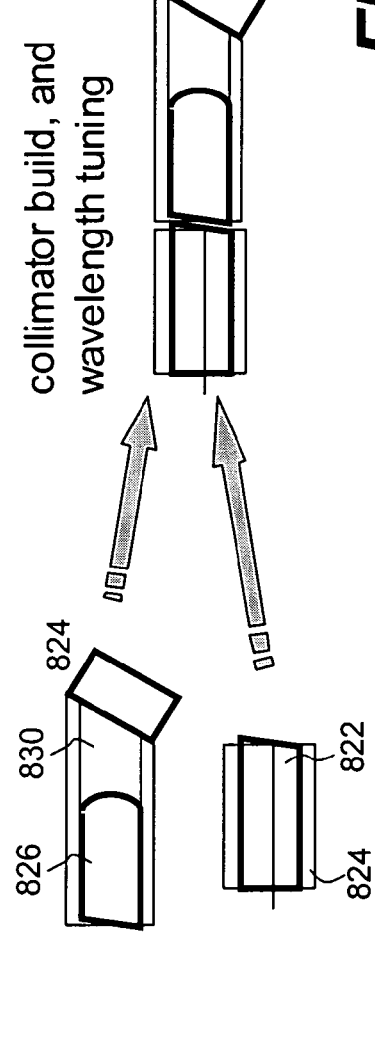
FIG. 8B shows a building processes for the assembly of FIG. 5.

The building processes for the assembly of FIG. 5 is relatively more complicated than that of FIG. 4, and is shown in FIG. 8B, first, bonding a pigtail 822 to a tube 824, a lens 826 and a filter 828 to a tube 830, adjusting the two tubes 824 and 830 for a lateral offset for a specified wavelength. The axial gap between the pigtail 822 and the lens 826 shall be kept for a minimum loss from a reference collimator to the collimator under building. The adjustment may be cyclic. Once the wavelength and loss fall into an acceptable range, bond the two tubes 824 and 830.

Figure 8C:
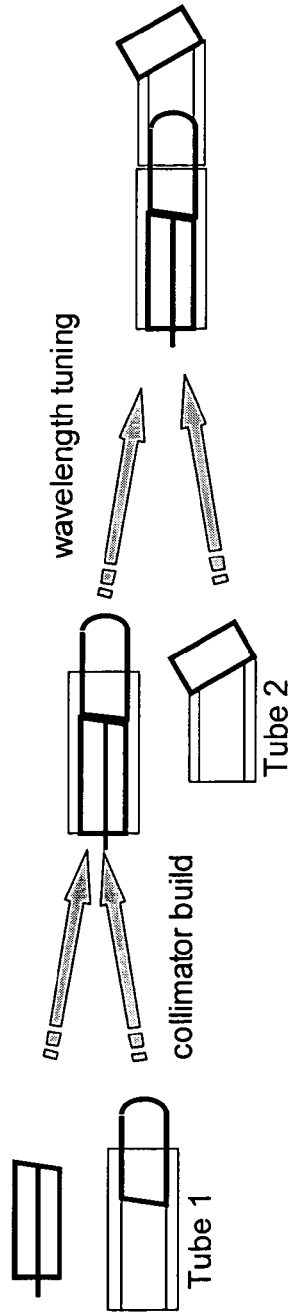
FIG. 8C shows one method, first building a regular collimator in tube 1, then bonding a filter with tube 2.

As far as the building of the assembly in FIG. 6A or FIG. 6B is concerned, there are two methods according to one embodiment. FIG. 8C shows one method, first building a regular collimator in tube 1, then bonding a filter with tube 2. The tube 2 is placed to receive the extended portion of the lens beyond the tube 1 and rotated for a specified wavelength. After that, the tube 1 and tube 2 are boned with a type of epoxy. In this method, the collimator coupling loss is tuned with two collimation lenses. This works fine when the thin film filter is thin enough so that it can be treated as a flat plate, i.e., a radius of curvature is close to infinity, for example, in CWDM case. In reality, the actual coating, due to stress and tension, in the central part is slightly thicker than that in the outer part, resulting in a convex shape. Such a curvature is equivalent to a convex lens, which affects the beam propagation behavior, hence the coupling loss. Sometimes, it may be noted that there are more layers that a coating has, the more serious this effect may demonstrate. For 100 GHz DWDM filters, the lens effect may not be ignored.

Figure 8D:
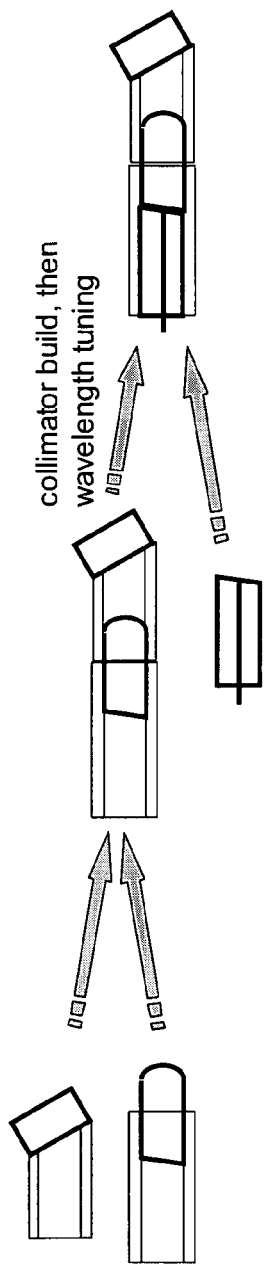
FIG. 8D shows another method of manufacturing an assembly.

To minimize such an effect, FIG. 8D shows another method of manufacturing an assembly. First a lens is bonded with tube 1, then a filter is attached to tube 2. Tube 2 is then placed to receive the extended portion of the lens from tube 1, without fixation. After that a pigtail is inserted into tube 1, following the standard collimator building processes to minimize the coupling loss and fix the pigtail, tube 2 is rotated to tune for a specified wavelength. Tube 1 is then bonded to tube 2.

Once the filter-collimator assemblies have been built, they are mounted as needed to a common substrate as illustrated in FIG. 2A. Since a wavelength has been pre-tuned, unlike the free-space WDM devices in prior art which need adjustment of both wavelength and loss on a substrate, only loss minimization is required.

In one embodiment, the devices contemplated in accordance with the present invention works very well for small filter incidence angle (AOI) ranging 0°~60°. According to the interference filter theory, the passband shape (including bandwidth, ripple, steepness, etc) and the band central wavelength (CWL) are well formed.

Figure 9:
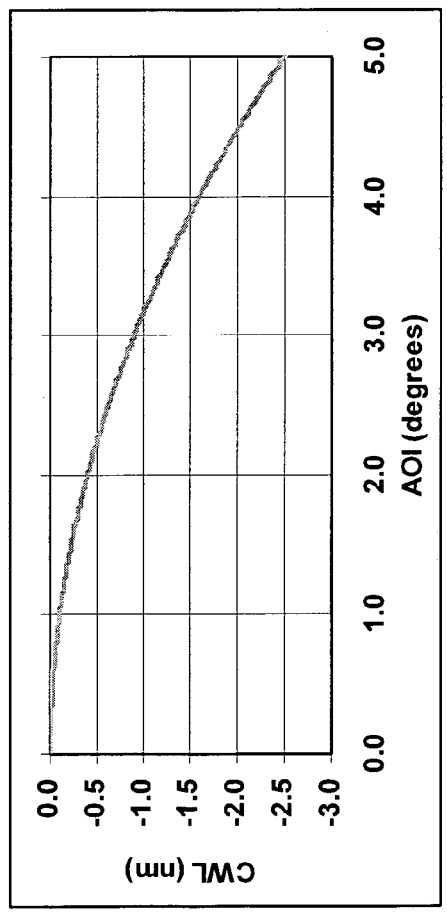
FIG. 9 shows an AOI design based on filter characteristics curve (CWL v.s. AOI).

For CWDM application, a certain range of CWL shift is manageable as the bandwidth is wide enough to tolerate. For DWDM case, the CWL shift is handled by two methods: (1) special coating design to obtain the right CWL; (2) special AOI design to shift current commercially available filters to an adjacent channel. In one embodiment, the AOI design is based on filter characteristics curve (CWL v.s. AOI) as demonstrated in FIG. 9.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical apparatus comprising:
at least a first assembly including a first tube with two ends, one of the two ends being polished to a slanted angle and attached externally with an optical filter in accordance with a predefined angle of incidence such that the optical filter transmits a signal of a predefined wavelength via a free space to a second assembly with a similar structure to that of the first assembly, wherein the first tube encapsulates a lens, the assembly further includes a second tube that encapsulates a fiber pigtail, the first and second tubes are adjusted for a lateral offset for a specified wavelength before being bonded together; and
a substrate on which the first assembly, the second assembly and a common collimator are bonded to form an integrated piece.

2. The optical apparatus of claim 1, wherein the first tube further includes a lens and a fiber pigtail that are encapsulated, both the lens and the fiber pigtail being coaxially aligned.

3. The optical apparatus of claim 2, wherein there is a gap between the fiber pigtail and the lens, the gap is adjusted so as to collimate properly a light beam from the fiber pigtail.

4. The optical apparatus of claim 1, wherein there is an axial gap between the in the lens in the first tube and the fiber pigtail in the second tube, the axial gap is so determined that a coupling loss is kept minimum from a reference collimator to the assembly.

5. The optical apparatus of claim 4, wherein the first and second tubes are adjusted for a lateral offset for a specified wavelength, the wavelength and the coupling loss fall into acceptable ranges before the first and second tubes are bonded.

6. The optical apparatus of claim 1, wherein the assembly further includes a second tube that encapsulates a fiber pigtail and a lens, the lens and the fiber pigtail being coaxially aligned but the lens extends beyond the second tube.

7. The optical apparatus of claim 6, wherein the first tube receives an extended portion of the lens that extends beyond the second tube.

8. The optical apparatus of claim 7, wherein the first and second tubes rotate against each other to a specified position before the first and second tubes are bonded.

9. The optical apparatus of claim 7, wherein, when the first and second tubes rotate against each other, a normal of the filter also rotates but in a 3-dimension space.

10. A method for making an optical apparatus, the method comprising:
building a first assembly that includes a first tube with two ends, one of the two ends being polished to a slanted angle in accordance with a predefined angle of incidence, wherein the first tube encapsulates a lens, the assembly further includes a second tube that encapsulates a fiber pigtail, the first and second tubes are adjusted for a lateral offset for a specified wavelength before being bonded together;

building a second assembly that includes a tube with two ends, one of the two ends being polished to a slanted angle in accordance with a predefined angle of incidence;

attaching an optical filter to the slanted end of the first assembly such that the optical filter transmits a signal of a predefined wavelength via a free space to the second assembly; and bonding the first assembly, the second assembly and a common collimator onto a substrate to form an integrated piece.

11. The method of claim 10, wherein both the lens and the fiber pigtail in the first tube being coaxially aligned.

12. The method of claim 11, wherein there is a gap between the fiber pigtail and the lens, the gap is adjusted so as to collimate properly a light beam from the fiber pigtail.

13. The method of claim 10, wherein there is an axial gap between the in the lens in the first tube and the fiber pigtail in the second tube, the axial gap is so determined that a coupling loss is kept minimum from a reference collimator to the first assembly.

14. The method of claim 13, wherein the first and second tubes are adjusted for a lateral offset for a specified wavelength, the wavelength and the coupling loss fall into acceptable ranges before the first and second tubes are bonded.

15. The method of claim 10, wherein the assembly further includes a second tube that encapsulates a fiber pigtail and a lens, the lens and the fiber pigtail being coaxially aligned but the lens extends beyond the second tube.

16. The method of claim 15, wherein the first tube receives an extended portion of the lens that extends beyond the second tube.

17. The method of claim 16, wherein the first and second tubes rotate against each other to a specified position before the first and second tubes are bonded.

* * * * *